US012601334B2

(12) United States Patent
Krane et al.

(10) Patent No.: US 12,601,334 B2
(45) Date of Patent: Apr. 14, 2026

(54) VARIABLE DISPLACEMENT HYDRAULIC PUMP SYSTEM WITH OVER-TEMPERATURE PREVENTION

(71) Applicant: Parker-Hannifin Corporation, Cleveland, OH (US)

(72) Inventors: Steve A. Krane, Cochise, AZ (US); Dean R. Pollee, Mattawan, MI (US); Evan W. Anderson, Portage, MI (US); Daniel P. Rapin, Schoolcraft, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 19/051,273

(22) Filed: Feb. 12, 2025

(65) Prior Publication Data

US 2025/0179999 A1     Jun. 5, 2025

Related U.S. Application Data

(63) Continuation of application No. 17/624,966, filed as application No. PCT/US2020/051153 on Sep. 17, 2020, now Pat. No. 12,247,555.
(Continued)

(51) Int. Cl.
*F04B 1/29*          (2020.01)
*F04B 1/26*          (2006.01)
(Continued)

(52) U.S. Cl.
CPC ................ *F04B 1/29* (2013.01); *F04B 1/26* (2013.01); *F04B 49/10* (2013.01); *F16K 31/002* (2013.01)

(58) Field of Classification Search
CPC .. F04B 49/10; F04B 1/29; F04B 49/12; F16K 31/002
See application file for complete search history.

(56) References Cited

U.S. PATENT DOCUMENTS 3,957,396 A  *   5/1976  Cooper ................. F04B 49/08
                                                  417/218
4,303,197 A     12/1981  Sandau
(Continued)

FOREIGN PATENT DOCUMENTS

DE      102015000805 B3    1/2016
EP           0258680 A1    3/1988
(Continued)

OTHER PUBLICATIONS

English Machine Translation of JP-2014119107-A (Year: 2014).
(Continued)

*Primary Examiner* — Nathan C Zollinger
(74) *Attorney, Agent, or Firm* — Renner, Otto, Boisselle & Sklar, LLP

(57)          ABSTRACT

A pump system including a prevention mechanism for preventing excessive fluid temperature buildup of system fluid. The overheat prevention mechanism includes a thermally-responsive control component made with a thermally-responsive material. The thermally-responsive control component is located in the pump system such that the thermally-responsive material is in thermal communication with the system fluid for effecting a change in temperature of the thermally-responsive material. The thermally-responsive material is configured to have an activation temperature that is a predefined amount less than a maximum operating temperature of the system fluid. The thermally-responsive control component is configured to cooperate with a pump control mechanism in the system to decrease pump output pressure in response to the thermally-responsive material being heated by the fluid to a temperature that is equal to or greater than the activation temperature of the thermally-responsive material.

6 Claims, 8 Drawing Sheets

Related U.S. Application Data

(60) Provisional application No. 62/903,073, filed on Sep. 20, 2019.

(51) Int. Cl.
  F04B 49/10       (2006.01)
  F16K 31/00       (2006.01)

(56)            References Cited

U.S. PATENT DOCUMENTS

| | | | |
|---|---|---|---|
| 4,537,346 A | | 8/1985 | Duprez |
| 5,048,751 A | * | 9/1991 | DuBois ................. F16K 17/003 |
| | | | 137/508 |
| 5,213,477 A | | 5/1993 | Watanabe et al. |
| 5,341,837 A | | 8/1994 | Johnson |
| 5,511,576 A | | 4/1996 | Borland |
| 6,186,168 B1 | | 2/2001 | Schultz et al. |
| 8,360,742 B2 | | 1/2013 | Kimoto et al. |
| 10,443,584 B2 | * | 10/2019 | Maruoka ................. F04B 1/124 |
| 10,935,052 B2 | * | 3/2021 | Bacchiega ............ F16K 17/003 |
| 11,236,744 B2 | * | 2/2022 | Andreis ................... F04B 49/24 |
| 12,247,555 B2 | * | 3/2025 | Krane ....................... F04B 1/20 |
| 2011/0139270 A1 | | 6/2011 | Veilleux, Jr. |
| 2012/0247582 A1 | * | 10/2012 | Lamb ................. G05D 23/1333 |
| | | | 137/468 |
| 2013/0226415 A1 | | 8/2013 | Smith et al. |
| 2015/0020759 A1 | | 1/2015 | Watanabe et al. |
| 2018/0010598 A1 | * | 1/2018 | Andreis ................. F04C 28/26 |

FOREIGN PATENT DOCUMENTS

| | | | |
|---|---|---|---|
| EP | 0798461 A2 | 10/1997 | |
| EP | 1052406 A2 | 11/2000 | |
| EP | 3088279 A1 | 11/2016 | |
| GB | 722864 A | 2/1955 | |
| GB | 2443329 A | 4/2008 | |
| JP | S59220456 A | 12/1984 | |
| JP | H10176660 A | 6/1998 | |
| JP | 2014119107 A | * 6/2014 | |

OTHER PUBLICATIONS

Reuters Staff, "Airbus issue software fix for A350 on explosion risk", Aug. 24, 2017, source: https:// www.reuters.com/article/US-airbus-a350-safety-id USKCN 1 B40OX.

G. Elliott, "Eutectic plug valve", Bifold Group, Oct. 19, 2016, source: https://www.bifold.co.uk/item/Certificates/Safety%20Man u als/SM.015_0%20-%20ETSV%20Eutectic%20 Pl ug%20V alve% 20Safety%20Manual.pdf.

International Search Report and Written Opinion of the International Searching Authority for corresponding International Patent Application No. PCT/US2020/051153, dated Jan. 27, 2021.

Written Opinion of the International Preliminary Examining Authority for corresponding International Patent Application No. PCT/US2020/051153, dated May 8, 2021.

International Preliminary Report on Patentability for corresponding International Patent Application No. PCT/US2020/051153, dated Nov. 11, 2021.

* cited by examiner

Discharge Pressure

Control Pressure

Case Pressure

Internal Pump Case

VARIABLE DISPLACEMENT HYDRAULIC PUMP SYSTEM WITH OVER-TEMPERATURE PREVENTION

RELATED APPLICATIONS

This application is a continuation of U.S. application Ser. No. 17/624,966 filed Jan. 5, 2022, which is a national phase of International Patent Application No. PCT/US2020/051153 filed Sep. 17, 2020, which claims the benefit of U.S. Provisional Application 62/903,073 filed Sep. 20, 2019, each of which is hereby incorporated herein by reference in its entirety.

TECHNICAL FIELD

The present disclosure relates generally to pump systems, and more particularly to pump systems with prevention mechanisms to prevent overheating of the working fluid.

BACKGROUND

Pumps are utilized to transfer working fluids in a variety of applications, including hydraulic motion control in aerospace applications. Certain types of failures of the hydraulic pump can cause a significant amount of heat generation that can be transferred to the working fluid. In applications that use heat exchangers to transfer heat between the hydraulic working fluid and a reservoir of fuel, such as in aircraft, there exists the possibility that a faulty pump will heat the hydraulic fluid above a threshold level, which may lead to a high-temperature reaction of the fuel vapor.

SUMMARY

Some conventional pumps may use redundant temperature sensors that sense hydraulic system fluid temperatures for overheat prevention. If the temperature limits of the hydraulic fluid are exceeded, an electrical solenoid on the pump is actuated to reduce the output pressure of the pump so that the pump does not produce enough leakage and/or enough friction to lead to excessive fluid temperatures. One problem with this conventional method includes the need for redundant temperature sensors, the possibility of multiple temperature sensors being simultaneously incorrect, and the need for additional software. Such conventional methods, therefore, may be complex, and also may be too slow to react to rapidly rising temperatures of the fluid exiting the pump. Other conventional pump designs may utilize mechanical methods to reduce pump output pressure; however, these mechanisms generally are not detectable before every usage cycle (e.g., flight) for detecting latent failures, and also may be too slow to react to rapidly rising fluid temperatures.

One aspect of the present disclosure provides a pump system having one or more prevention mechanisms that prevent excessive fluid temperature buildup of the fluid flowing through the system, such as those that can result from pump failure.

According to an aspect, the one or more of the prevention mechanisms may have no latent failures with a dormancy period greater than one usage cycle. In aviation, for example, one usage cycle may constitute a single flight. Such prevention mechanism(s) may enable detection before every usage cycle (e.g., flight) to better ensure that the system has no latent failure with a dormancy greater than one usage cycle (e.g., flight).

According to an aspect, the present disclosure provides a pump system having a prevention mechanism that includes a thermally-responsive material which senses an over-temperature event of the fluid in the system, and which cooperates with a fluid-operated control to decrease pump output pressure in response to the temperature of the thermally-responsive material being heated by the fluid up to or beyond an activation temperature of the material.

According to an aspect, the pump system may be configured to remain operational after the thermally-responsive material has reached or exceeded the activation temperature, such as by retaining the fluid within the pump system and/or maintaining operation of the pump at a decreased pump output pressure.

According to an aspect, a pump system includes: a pump for pumping fluid; a fluid-operated control fluidly connected to the pump and configured to increase or decrease pump displacement in response to a fluid pressure of the system being communicated to the fluid-operated control; and a thermally-responsive control component made with a thermally-responsive material, the thermally-responsive control component being located in the pump system such that the thermally-responsive material is in thermal communication with the fluid flowing through the pump system for effecting a change in temperature of the thermally-responsive material; wherein the thermally-responsive material is configured to have an activation temperature that is a predefined amount less than a maximum operating temperature of the fluid flowing through the pump system; and wherein the thermally-responsive control component is configured to cooperate with the fluid-operated control to cause a decrease in pump output pressure in response to the thermally-responsive material being heated by the fluid to a temperature that is equal to or greater than the activation temperature of the thermally-responsive material, and wherein the pump system can remain operational after the thermally-responsive material has reached or exceeded the activation temperature.

According to another aspect, a pressure compensation valve assembly for a pump system includes: a valve body having an inlet for fluid communication with a discharge port of a pump of the system for communicating a discharge pressure of the pump to the pressure compensation valve assembly, and an outlet for fluid communication with a control actuator of the system for communicating a control pressure to the control actuator; a compensator spool movable in the valve body between the inlet and the outlet; a compensator spring configured to apply a biasing force against one side of the compensator spool which counteracts the discharge pressure exerted against an opposite side of the compensator spool, and wherein the compensator spool moves between the inlet and the outlet in response to opposing forces exerted on the compensator spool by the biasing spring on the one side and the discharge pressure on the opposite side to thereby control fluid exiting the outlet at the control pressure for being received by the control actuator which is operative to increase or decrease pump displacement in response to the control pressure; and a thermally-responsive control component made with a thermally-responsive material having an activation temperature that causes a transformation of the material, the thermally-responsive control component being located in the pressure compensation valve assembly such that when the activation temperature of the thermally-responsive material is reached or exceeded, the thermally-responsive control component transforms to alter the biasing force of the compensator spring on the compensator spool thereby changing the control pressure in a way that decreases pump output pressure.

According to another aspect, a method of decreasing pump output pressure when a fluid of the pump is over-heated, includes: (i) pumping the fluid with the pump and discharging pressurized discharge fluid from the pump; (ii) routing at least some of the pressurized discharge fluid to a fluid-operated control; (iii) sensing a pressure of the pres-surized discharge fluid with the fluid-operated control and outputting fluid at a charge pressure from the fluid-operated control; (iv) varying pump displacement in response to the charge pressure; (v) before, during, and/or after one or more of steps (i)-(iv), sensing fluid temperature with a thermally-responsive material having an activation temperature; (vi) when the temperature of the thermally-responsive material reaches the activation temperature, trigger the fluid-operated control to cause a decrease in pump output pressure; and (vii) wherein after activation of the thermally-responsive material, the fluid is maintained within a pump circuit containing the pump.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when con-sidered in conjunction with the drawings.

BRIEF DESCRIPTION OF THE DRAWINGS

The annexed drawings, which are not necessarily to scale, show various aspects according to the present disclosure.

DETAILED DESCRIPTION

The principles and aspects according to the present dis-closure have particular application to pump systems for aerospace applications that include pumps and pump con-trols, such as pressure-compensated, swashplate-style axial piston hydraulic pumps, and thus will be described below chiefly in this context. It is understood, however, that principles and aspects according to the present disclosure may be used for other applications and/or with other types of pumps, such as radial piston, axial piston bent-axis type, variable vane pumps, or the like; or may be used with different types of operating fluids, as would be understood by those having ordinary skill in the art.

Figure 1:
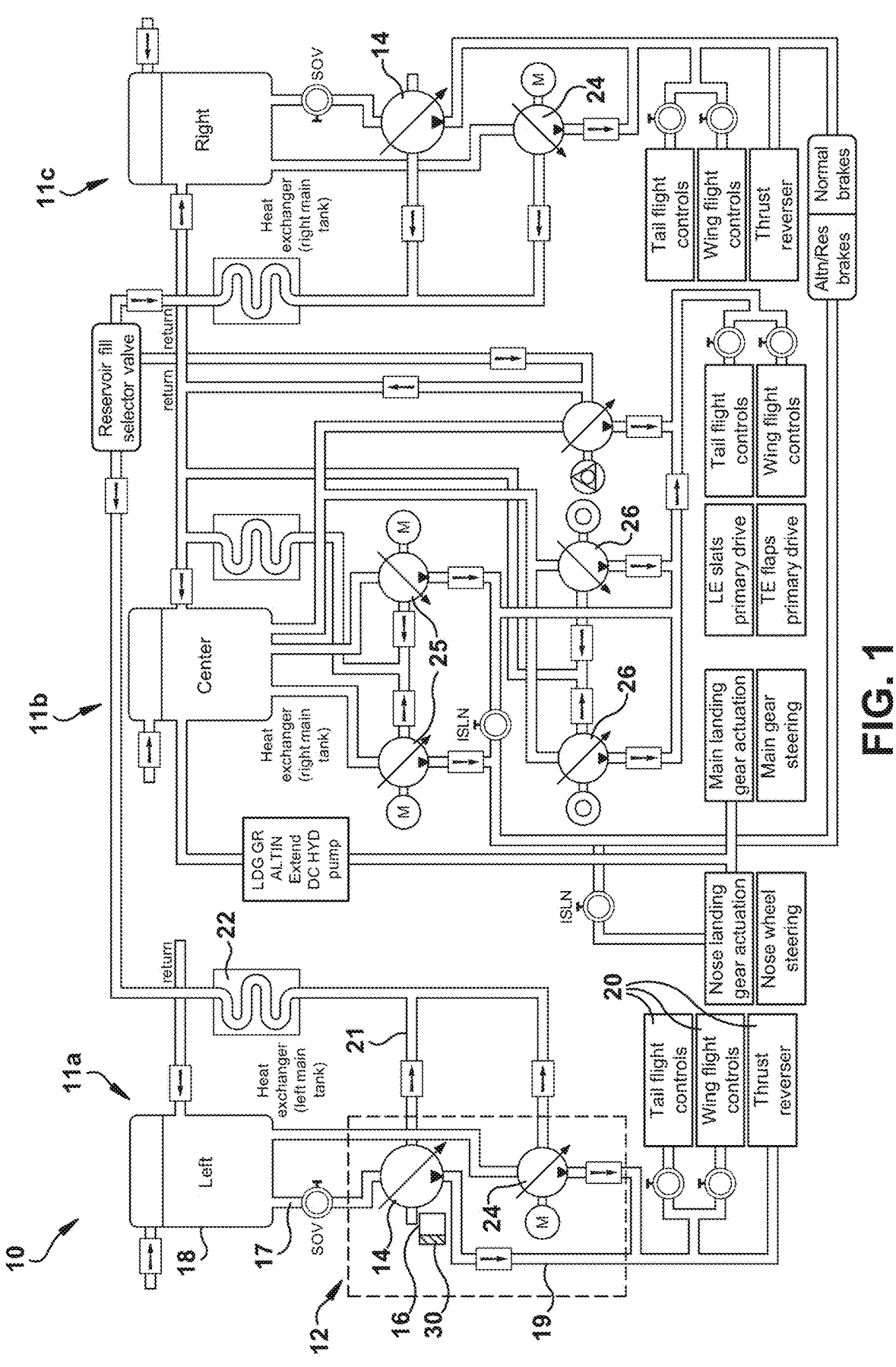
FIG. 1 shows a schematic view of a hydraulic circuit diagram including an exemplary pump system according to an embodiment.

Referring to FIG. 1, a hydraulic system 10 for an aircraft is shown, which includes at least one exemplary pump system 12 having an exemplary pump 14 and pump control 16, as described in further detail below. As shown, the at least one pump system 12 forms a portion of a hydraulic circuit and includes inlet fluid conduits 17 for connection to a reservoir 18 of the hydraulic circuit for storing hydraulic fluid, and outlet fluid conduits 19 for connection to fluid-operated consumers 20 (e.g., motors, actuators, etc.) for controlling the aircraft. The pump system 12, or pump circuit, also includes case drain fluid conduit(s) 21 which route output fluid from the pump 14 through a heat exchanger 22, which may be the fuel tank of the aircraft. Also as shown, the pump system 12 may include one or more additional pumps 24, such as supplemental pumps, which may supplement hydraulic power to the consumers 20 and serve for redundancy in the case of pump failure.

In the illustrated embodiment, the hydraulic system 10 is for a large commercial jet and includes three hydraulic sub-systems, or circuits, 11a, 11b and 11c; however, the aspects according to the present disclosure are not limited to such as system. The left 11a, center 11b, and right 11c systems may deliver hydraulic fluid at a rated pressure of 3,000 psi, for example, to operate flight controls, flap systems, actuators, landing gear, and brakes. Primary hydraulic power for the left 11a and right 11c systems is provided by two of the exemplary pumps 14, which are engine driven pumps in the illustrated embodiment. The primary pump 14 in each of the left 11a and right 11c systems is supplemented by an on-demand AC motor pump as the additional pump 24. As shown, primary hydraulic power for the center system 11b is provided by two electric motor pumps 25 (AC motor pumps) and supplemented by two air turbine-driven pumps 26. The center system 11b provides hydraulic power for the engine thrust reversers, primary flight controls, landing gear, and flaps/slats, for example.

As shown in in the illustrated embodiment, the left 11a and right 11c hydraulic systems are functionally the same. The left hydraulic system 11a supplies pressurized hydraulic fluid to operate the left thrust reverser and the flight control systems. The right hydraulic system 11c supplies pressur-ized hydraulic fluid to operate the right thrust reverser, flight control systems, and the normal brake system. For the sake of brevity, only the left hydraulic system 11a will be described in further detail below The reservoir 18 of the hydraulic subsystem 11a contains the hydraulic fluid supply for the pump system 12 having the main hydraulic pump 14 and the supplemental hydraulic pump 24. The reservoir 18 may be pressurized by bleed air through a reservoir pressurization module. The main pump 14 may draw fluid through the inlet fluid conduit 17, such as a standpipe, and the supplemental pump 24 may draw fluid from the bottom of the reservoir 18. The engine driven main pump 14 is the primary pump for the left hydraulic system 11a and operates whenever the engine operates. A suitable pump control mechanism 16 (described below) controls pump output pressure of the main pump 14. The supple-mental pump 24 is the on-demand pump for the left hydrau-lic system 11a, which normally operates only when there is high hydraulic system demand. The heat exchanger 22, which is installed in the left wing fuel tank, cools the hydraulic fluid from main pump 14 and supplemental pump 24 drain fluid conduits 21, or lines, before the fluid goes back to the reservoir 18.

Generally, the hydraulic system 10 may include suitable temperature, pressure and quantity sensors, with suitable communications modules, for measuring temperature, pressure and quantity of the hydraulic fluid and communicating the measurements to the flight deck. For example, a reservoir quantity transmitter (not shown) and temperature transducer (not shown) are installed on each of the reservoirs, and a hydraulic reservoir pressure switch is located on the pneumatic line between the reservoir pressurization module and the reservoir. The main pump 14 and supplemental pump 24 each may have a pressure transducer to measure pump output pressure, such as within filter modules of each of the pumps. A temperature transducer also may be installed in the case drain line of each filter module to measure pump case drain fluid temperature. A pressure relief valve also may be included on the filter module of the main pump 14 to protect the system against over-pressurization.

One potential issue that can occur with the hydraulic system 10 described above is that a failure of the main pump 14 can cause a significant amount of heat generation that can be transferred to the hydraulic fluid. Such internal failure of the pump 14 may include faulty pump component(s) that generate excessive friction and heat, for example. Alternatively or additionally, internal, recirculating leakage from high pressure to low pressure may increase fluid temperature. If the temperature of the hydraulic fluid were to increase beyond a threshold level (e.g., 400° F.; 205° C.), then the heat transferred from the hydraulic fluid into the fuel could lead to a high-temperature reaction of the fuel.

According to an aspect of the present disclosure, the exemplary pump system described herein can mitigate such overheating of the system fluid by providing a unique overheat prevention mechanism that senses temperature of the hydraulic fluid, and which cooperates with a pump control in response to such sensing to prevent excessive heat buildup of the hydraulic fluid. In exemplary embodiments, the prevention mechanism has no latent failures with a dormancy period greater than one usage cycle. A latent failure is one whose presence is not apparent to the flight crew or maintenance personnel. In aviation, for example, one usage cycle may constitute a single flight. For example, such a prevention mechanism may enable detection before every usage cycle (e.g., flight) to better ensure the system has no dormant failure with a latency greater than one usage (e.g., flight) cycle. This makes the pump system and/or prevention mechanism intrinsically incapable of producing fluid temperatures that exceed a certain threshold value, and enables flight crew and/or maintenance personnel to detect any failures of the prevention mechanism during each usage cycle (flight).

According to one or more aspects of the present disclosure (described here with exemplary, non-limiting reference to FIG. 1), the overheat prevention mechanism of the exemplary pump system 12 includes a thermally-responsive control component 30 made with a thermally-responsive material. The thermally-responsive control component 30 is located in the pump system 12 such that the thermally-responsive material is in thermal communication with the fluid flowing through the system for effecting a change in temperature of the thermally-responsive material. The thermally-responsive material is configured to have an activation temperature that is a predefined amount less than a maximum operating temperature of the fluid flowing through the system. The thermally-responsive control component 30 is configured to cooperate with the pump control mechanism 16 in the system to cause a decrease pump displacement in response to the thermally-responsive material being heated by the fluid to a temperature that is equal to or greater than the activation temperature of the thermally-responsive material.

The exemplary pump 14 may be any suitable pump, including a variable displacement pump, such as a swashplate-type axial piston pump, a radial piston pump, an axial piston bent-axis type pump, a variable vane pump, or the like. In exemplary embodiments, the pump 14 includes a variable displacement axial piston pump that is driven by a prime mover, such as the aircraft engine described above.

The exemplary control mechanism 16 may include any suitable control for controlling output pressure of the pump. In exemplary embodiments, the control mechanism 16 is a fluid-operated control (also 16) having one or more parts fluidly connected to and/or mechanically coupled to the pump 14 and which is configured to increase or decrease pump displacement in response to a fluid pressure of the system being communicated to the fluid-operated control 16. The exemplary fluid-operated control 16 also cooperates with the thermally-responsive control component 30 to decrease pump output pressure in response to the thermally-responsive material being heated to or above its activation temperature, as described in further detail below. In exemplary embodiments, the fluid-operated control 16 includes a pressure compensation valve and/or a control piston for controlling an angle of a swashplate of the pump, as described in further detail below. Such fluid-operated control may provide a relatively simple, reliable, and fast method of controlling the pump while enabling detection of latent failure modes.

The thermally-responsive control component 30 may be made with any suitable thermally-responsive material having an activation temperature that causes a transformation, transition or stimulus of the material in such a way that it enables the thermally-responsive control component 30 to operatively signal to the control mechanism 16 that pump output pressure should be reduced. The thermally-responsive material is configured to have an activation temperature that is a predefined amount less than a maximum operating temperature of the fluid flowing through the system to prevent failures within the system, such as to prevent high-temperature reactions of the liquid fuel in the aircraft, for example. The activation temperature may be a value in a range from about 10° C. to about 100° C. less than the maximum operating temperature of the fluid in the system 12. For example, if a maximum temperature limit of the hydraulic fluid is set to 400° F. (205° C.), then the thermally-responsive material may have an activation temperature with a value in a range from about 221° F. (about 105° C.) to about 383° F. (about 195° C.), such as, an activation temperature of about 105° C., about 125° C., about 150° C., about 175° C., about 190° C., or about 195° C. (including all values between the stated values).

In exemplary embodiments, the thermally-responsive material may include a phase transition material that is configured to transition from one phase to another phase at the activation temperature. The phase transition material may be configured as a thermal actuator, a thermal switch, or a thermal fuse, for example. The phase transition material may be configured to undergo a first order phase transition at the activation temperature, such as a transition from solid to liquid, for example, in which the activation temperature is the melting point of the material. In exemplary embodiments, the phase transition material is a eutectic alloy that transitions directly from solid to liquid at a prescribed temperature. Non-limiting examples of such eutectic alloys that may be used in the system 12 include Indalloy 86 (60% bismuth, 40% cadmium) with a eutectic melting point of 144° C.; or Indalloy 103 (67.8% tin, 32.2% cadmium) with a eutectic melting point of 177° C.

In other embodiments, the phase transition material may be configured to undergo a transition in its atomic structure, such as its crystal structure. For example, the phase transition material may be a shape memory material, such as a shape memory alloy or a shape memory polymer. A shape memory alloy may be configured to transition between an austenitic crystal state to a martensitic crystal state at an activation temperature. A shape memory polymer may be configured to transition between a deformed state (temporary shape) to an original (permanent) shape induced by going above or below the activation temperature. In yet other embodiments, the phase transition material may include a thermal expansion material that is configured to expand by a prescribed amount in a particular direction at a prescribed activation temperature, as described in further detail below.

The thermally-responsive control component 30 may be positioned at any suitable location within the pump system 12 for providing suitable thermal communication with the hydraulic fluid to sense hydraulic fluid temperature via the thermally-responsive material. The thermal communication may include direct contact with the hydraulic fluid or indirect contact with the hydraulic fluid. Where direct contact with the hydraulic fluid is provided, the thermally-responsive material may be a material that is compatible with the hydraulic fluid at the operating temperatures, or which may have a coating that is compatible with the fluid.

The thermally-responsive control component 30 made with the thermally-responsive material may have any suitable shape or form for cooperating with other components of the pump system to effect signaling to the control mechanism 16 to reduce pump output pressure when the activation temperature of the thermally-responsive material is reached or exceeded. In exemplary embodiments, the thermally-responsive control component 30 may be formed as a spacer, a plug, a switch, an actuator, a spring, an expander, a support, or any other suitable structure. The thermally-responsive control component 30 may include a portion that is made with the thermally-responsive material, or may be made entirely of the thermally-responsive material. The thermally-responsive control component also may be made with other materials in addition to the thermally-responsive material as may be desirable for particular applications.

The thermally-responsive control component 30 relies on the physical properties of the thermally-responsive material, which can be assumed to have no mechanical failure modes. In exemplary embodiments that utilize certain thermally-responsive materials, such as eutectics, the irreversible phase transition (e.g., melting) of the material impacts the fundamental operation of the pump system such that triggering of the phase transition (e.g., eutectic melt) can be detected during the usage cycle in which the failure occurred (e.g., flight). This ensures the prevention mechanism will have no latent failures with a dormancy period greater than one usage cycle.

The efficacy of the prevention mechanism also may depend on the cooperative relationship between the thermally-responsive control component 30 and the fluid-operated control 16. For example, during normal pump system operation, one or more components of the fluid-operated control 16 are configured to move in a precise manner for fluid control, but when the thermally-responsive material is activated these component(s) react to the change by moving in a different manner than normal, which indicates a failure of the system. This enables testing and detection of the failure before every usage cycle (e.g., flight). Moreover, the cooperative relationship between the thermally-responsive control component 30 and the fluid-operated control 16 may enable a relatively quick response to overheating events by disabling or reducing the power input at the source of the heat generation (e.g., faulty pump).

In exemplary embodiments, the pump system 12 also is configured to remain operational even after the thermally-responsive material has reached or exceeded its activation temperature and completed its transformation or transition. For example, the activation of the thermally-responsive material (e.g., eutectic) may be such that the hydraulic fluid remains in the pump system to enable continued operation of additional pump(s), such as supplemental pump 24. For example, upon activation of the thermally-responsive material (e.g., via melting), the hydraulic fluid may return to the pump case or other portion of the pump circuit 12. This is in contrast with conventional pump case fuse plug designs in which the hydraulic fluid is traditionally discharged out of the system and dumped overboard. Alternatively or additionally, the activation of the thermally-responsive material may enable the pump 14 to remain operation with a decreased pump output pressure, such that the pump does not generate excessive heat due to any internal failure.

Figure 2:
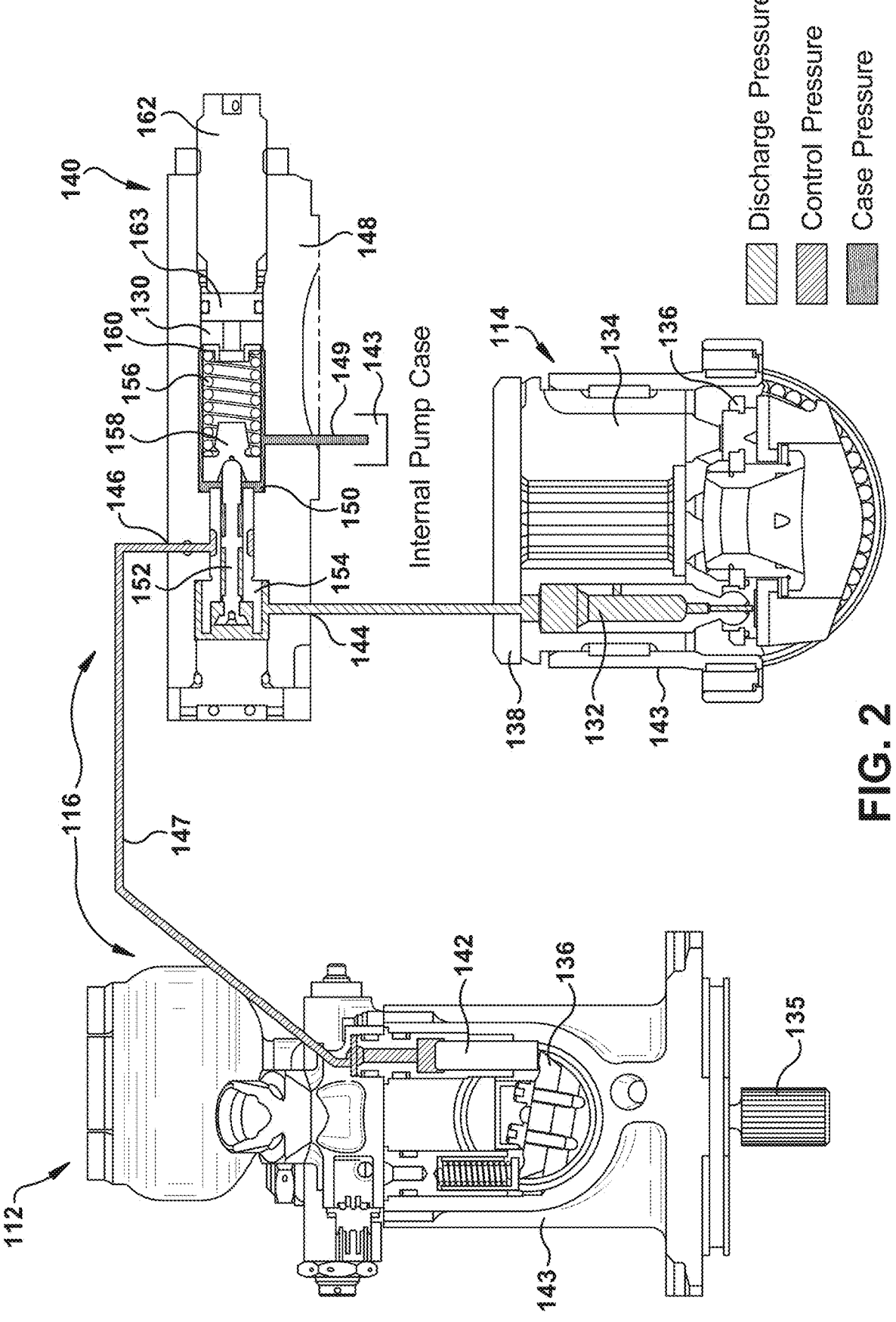
FIG. 2 shows a multi-cross-sectional and schematic view of an exemplary pump system according to an embodiment, which is shown in an exemplary normal operating state.
Figure 3:
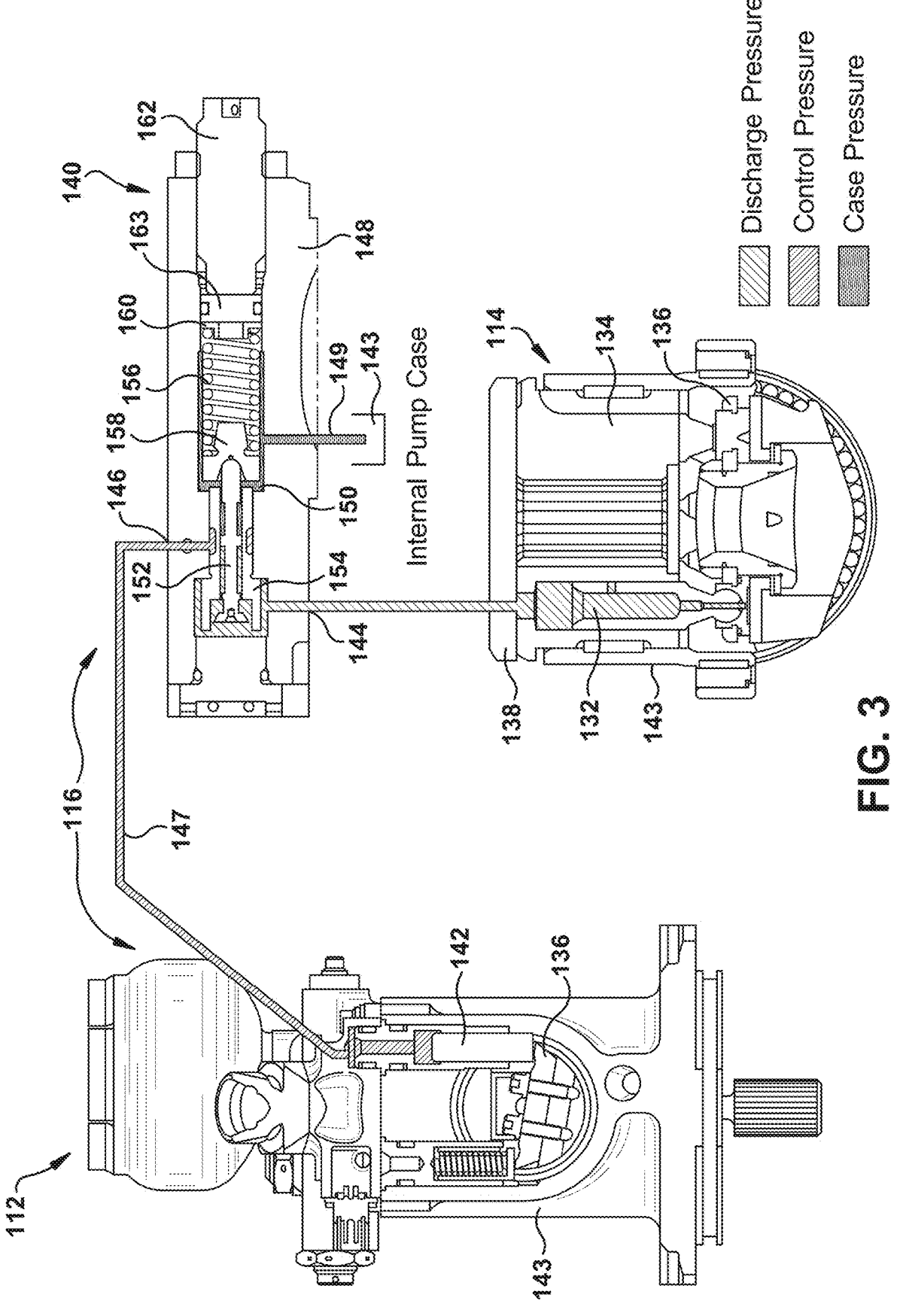
FIG. 3 shows a multi-cross-sectional and schematic view of the pump system in FIG. 2, which is shown in an exemplary overheated state.
Figure 4:
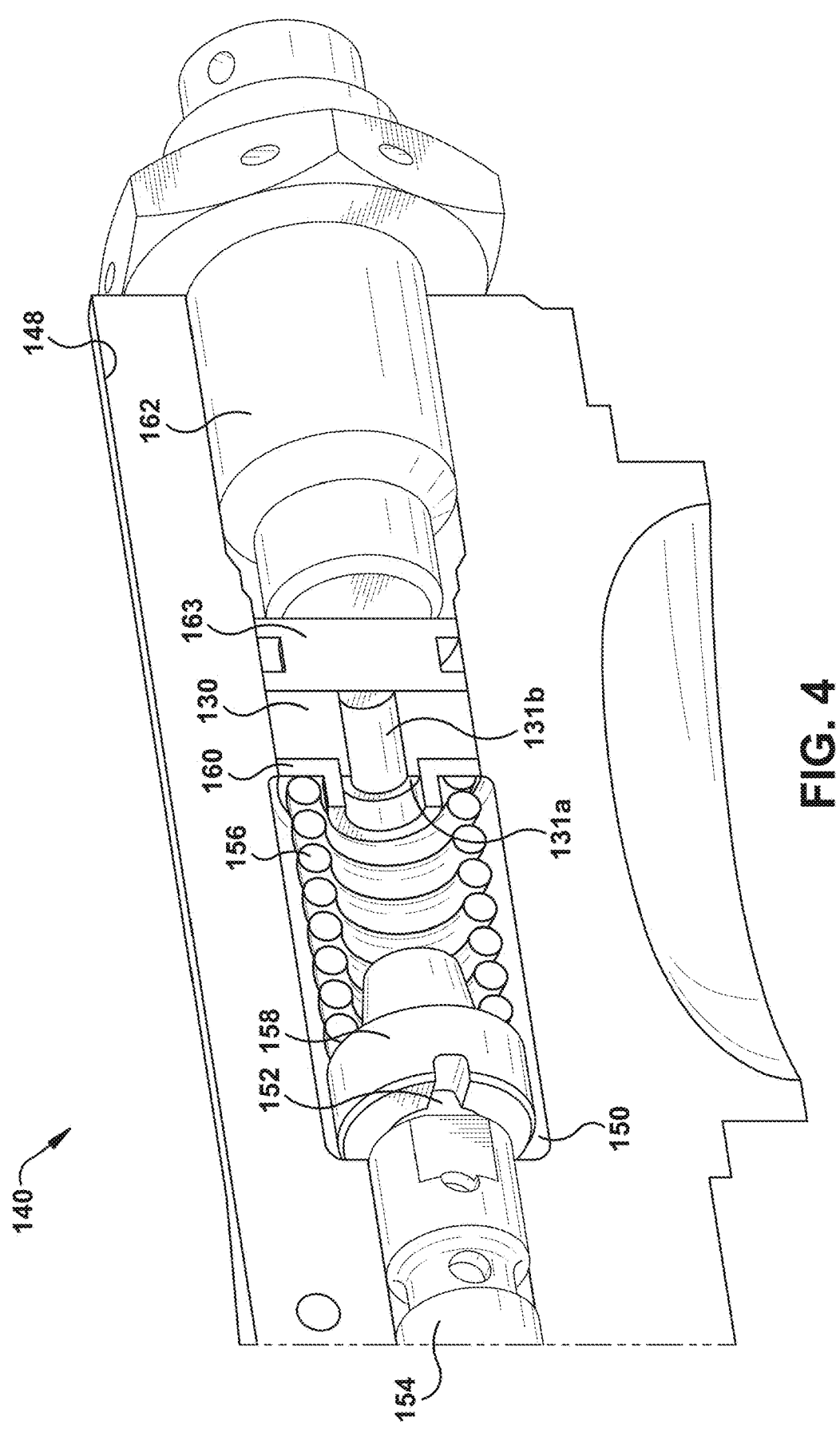
FIG. 4 shows an enlarged cross-sectional perspective view of a portion of an exemplary fluid-operated control of the pump system shown in FIGS. 2 and 3.
Figure 5:
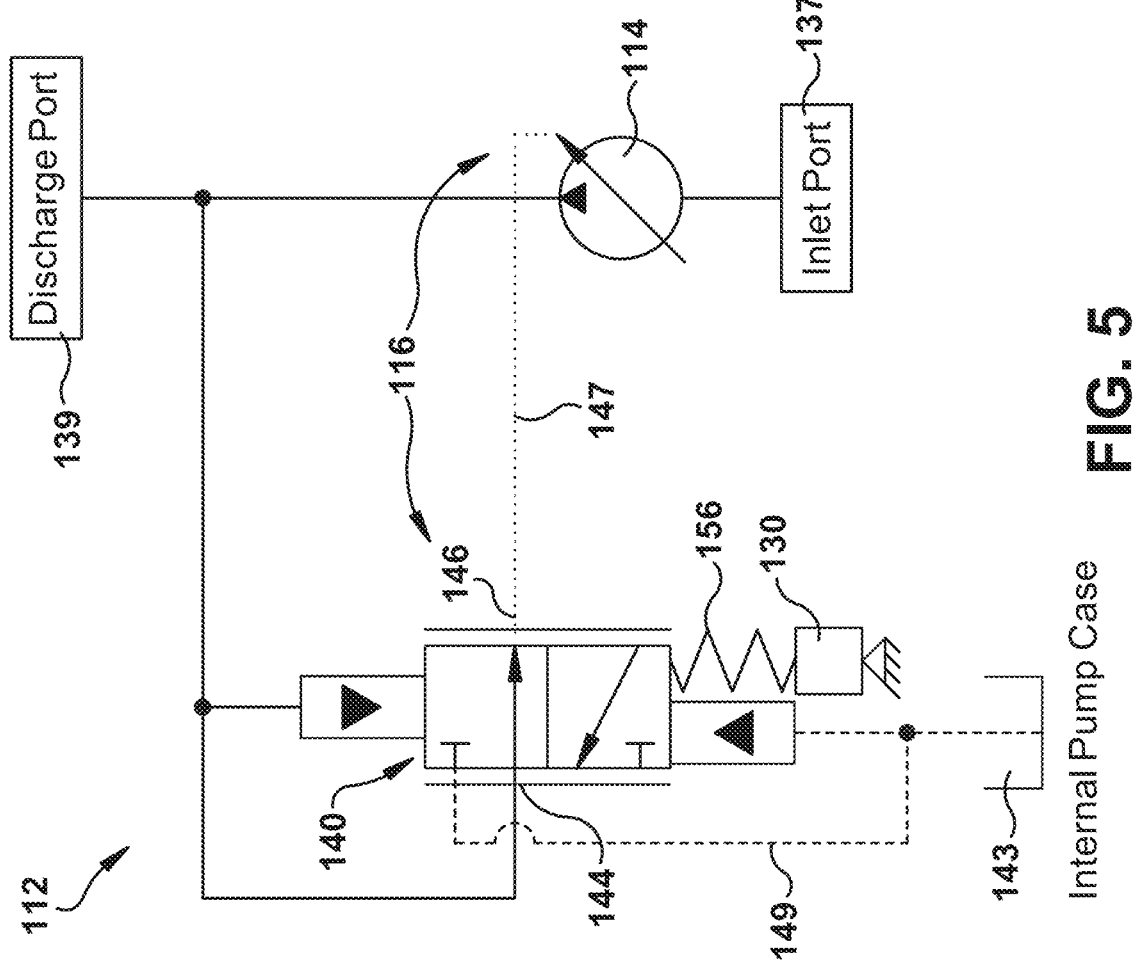
FIG. 5 shows a schematic view of hydraulic circuit diagram of the pump system shown in FIGS. 2 and 3.

Referring to FIGS. 2-5, an exemplary embodiment of a pump system 112 including a pump 114, a fluid-operated control 116, and a thermally-responsive control component 130 is shown. The pump system 112 and pump 114 may be used as the pump system 12 and main pump 14 in the hydraulic circuit of FIG. 1. Accordingly, the same reference numerals but indexed by 100 are used to denote structures corresponding to similar structures between the pump system 12 and the pump system 112. As such, the foregoing description of the pump system 12 is equally applicable to the pump system 112. In the illustrated embodiment, FIG. 2 shows a multi-cross-sectional and schematic view of the pump system 112 in a normal operating state, and FIG. 3 shows a multi-cross-sectional and schematic view of the pump system 112 in an overheated state. FIG. 4 shows an enlarged cross-sectional perspective view of a portion of the fluid-operated control 116 and the thermally-responsive control component 130. FIG. 5 illustrates a hydraulic circuit diagram of the pump system 112.

In the illustrated embodiment, the pump 114 is a variable displacement axial piston pump. The pump 114 is a type of positive displacement machine in which mechanical input power is converted to fluid power via the motion of pistons 132 within a cylinder block 134. A drive shaft 135, which may be coupled to a prime mover (e.g., aircraft engine) effects rotation of the cylinder block 134 about the longitudinal axis of the pump. The pistons 132 are housed within the cylinder block 134 so that the rotation of the cylinder block causes the pistons 132 to also revolve about the longitudinal axis. As the pistons 132 complete each revolution, the piston shoes sit on a thin fluid film bearing between the piston shoes and a tiltable swashplate 136 . . . . Because the piston shoes are constrained to follow the surface of the swashplate 136, the pistons 132 are forced to reciprocate axially as they complete a full revolution about the longitudinal axis. As each piston 132 completes a full revolution, fluid is drawn in via an inlet port 137 (FIG. 5) in a port plate 138, and expelled via a discharge port 139 (FIG. 5) in the port plate 138. The displacement of the pump is a measure of the total fluid volume that is displaced during one full revolution of the drive shaft 135. In the variable displacement axial piston pump, the displacement of the pump is manipulated by varying the angle of the swashplate 136, and thus changing the amount of axial reciprocation by each piston 132 as it completes a full revolution.

In the illustrated embodiment, the pump 114 is a pressure-compensated variable displacement axial piston pump in which the fluid-operated control 116 includes a pressure compensation valve assembly 140, or pressure compensator, and a control piston 142 that is operative to tilt the swashplate 136. Generally, the control piston 142 is operative in response to a control fluid pressure from the pressure compensator 140 to vary the angle of the swashplate 136 and thus the displacement of the pump 114. In such a pump design, the displacement may be varied to achieve a designated pressure at the pump discharge port 139. In the illustrated embodiment, the control piston 142 and swashplate 136 are contained within a pump case 143 that is the same pump case containing the rotating pistons 132 and cylinder block 134. In exemplary embodiments, the pressure compensation valve assembly 140 is mounted on or in the pump case 143; however, the pressure compensation valve assembly also may be located remotely from the pump case 143.

During normal operation, the pressure compensation valve assembly 140 receives pump discharge fluid via an inlet port 144 of the valve and controls the flow of the pump discharge fluid through the valve as a control fluid exiting an outlet port 146 of the valve at a control pressure. The control pressure is communicated to the control piston 142 via a control line 147. In the illustrated embodiment, the control piston 142 is configured as an off-stroke biased piston (also 142) which is configured to bias the swashplate 136 toward its minimum displacement (e.g., off-stroke) position. If the pressure compensation valve assembly 140 senses that the discharge pressure has dropped below the designated or setpoint pressure, the valve assembly 140 allows less control fluid to reach the off-stroke bias piston 142. This reduces the force on the off-stroke bias piston 142, thereby increasing the displacement of the pump 114 until the desired pressure is achieved. If the pressure compensation valve assembly 140 senses that the discharge pressure has exceeded the designated pressure, the valve assembly 140 allows more control fluid to reach the off-stroke bias piston 142. This increases the force on the off-stroke bias piston 142, thereby decreasing the displacement of the pump 114 until the desired pressure is achieved. The pump displacement may be varied in this way between its minimum displacement and its maximum displacement.

As shown particularly in FIG. 4, with reference also to FIGS. 2, 3 and 5, the pressure compensation valve assembly 140 includes a valve body 148 having the inlet 144 fluidly connected to the discharge pressure of the pump 114, the outlet 146 fluidly connected to the control piston 142 via control line 147, and a passage 149 fluidly connecting an internal cavity 150 of the valve to internal pump case pressure or other reference pressure.

As shown, the pressure compensation valve assembly 140 contains an axially slidable compensator spool 152 disposed within a compensator sleeve 154, and a compensator spring 156 having at one end a compensator spring guide 158 that is operatively coupled to the compensator spool 152 for movement thereof. The opposite forces on the compensator spool 152 provided by the discharge pressure acting on one side of the compensator spool 152 and the compensator spring 156 acting on the opposite side of the spool 152 causes the compensator spool to move in the valve body 148 and relative to the sleeve 154 to vary a size of a variable orifice between the compensator inlet 144 and compensator outlet 146. The pressure compensator 140 maintains a constant internal pressure drop across the variable orifice by automatically adjusting volume flow rate delivered to the variable orifice from the flow supply in response to changing pressure drop between the compensator inlet 144 and compensator outlet 146. At an opposite end of the compensator spring 156 is a compensator spring seat 160, in which the position of the spring seat 160 is adjustable via an adjuster screw 162. The adjuster screw 162 can be screwed in or out of the valve body 148 to change the spring seat position to manipulate the spring force that is acting on one side of the compensator spool 152, and thus the desired output pressure of the pump 114.

As shown in the illustrated embodiment, the thermally-responsive control component 130 made with the thermally-responsive material is disposed within the pressure compensation valve assembly 140 and thus forms a component thereof. As shown, the thermally-responsive control component 130 is formed as thermally-responsive spacer (also 130) toward one end of the compensator spring 156, such as between the spring seat 160 and the adjuster screw 162. The adjuster screw 162 may have an adjuster plug 163 at one end thereof to sealingly plug the internal cavity 150 of the valve body, such as with a suitable seal. As shown, the thermally-responsive spacer 130 may include a forwardly projecting portion 131a for being received within the spring seat 160 and/or the spring 156. The thermally-responsive spacer 130 also may contain an internal passage 131b which communicates flow to the adjuster plug 163 and which may increase surface area of the spacer 130 that is exposed to fluid temperature to facilitate heat transfer.

In the illustrated embodiment, the thermally-responsive material of the spacer 130 is a eutectic material that melts at a preset activation temperature (e.g., eutectic melting point). The activation temperature may be chosen based on the chemistry of the material (e.g., metal alloy) such that the eutectic spacer 130 melts at a temperature less than the maximum operating temperature of the system hydraulic fluid, such as at those activation temperature values described above. As discussed above, the eutectic spacer 130 may include Indalloy 86, Indalloy 103, or any other suitable material or combination of materials.

Referring back to FIG. 2, and also to FIG. 5, during normal operation of the pump at normal operating temperatures, the eutectic spacer 130 remains in a solid state. The pump discharge pressure acts on the left side of the compensator spool 152 against the force supplied by the spring 156. This balancing of forces on opposite sides of the spool 152 regulates the flow of control circuit fluid across the variable orifice and through compensator sleeve 154 to the control piston 142. By controlling the pump's displacement, the pressure compensator 140 is able maintain a regulated discharge pressure.

As described above, an internal failure of the pump 114 can cause a significant amount of heat to be added to the hydraulic fluid, either through an act of friction, or by internal, recirculating, leakage from high pressure to low pressure. This heat addition may rapidly heat the fluid exiting the pump via the discharge port 139 and/or case drain port which is routed to heat exchanger 22. The overheated fluid is in thermal communication with the eutectic spacer 130. In the illustrated embodiment, for example, the eutectic spacer 130 is located at an end portion of the internal cavity 150 that contains fluid at the pump case pressure, and the overheated fluid circulates through the internal cavity 150 containing the eutectic spacer 130.

Referring particularly to FIGS. 2 and 3, the thermally-responsive control component 130 (e.g., eutectic spacer) is configured to cooperate with the fluid-operated control 116 (e.g. pressure compensator 140 and/or control piston 142) to cause a decrease in the pump output pressure in response to the thermally-responsive material being heated by the fluid to meet or exceed the material activation temperature. Because of its low latent heat of fusion, the eutectic spacer 130 in the illustrated embodiment can quickly melt away at its activation temperature (e.g., melting point) before the maximum operation temperature of the hydraulic fluid is reached. As the eutectic spacer 130 melts away, it allows an end of the spring 156 and/or the compensator spring seat 160 to shift away from the spool 152 and seat itself against the adjuster plug 163. As the compensator spring 156 extends to the new location of the spring seat, the setpoint pressure of the pump is greatly reduced because the compensator spool 152 is allowed to shift to the right, thereby reducing pump output pressure.

The reduced output pressure may enable the pump 114 to operate while reducing the failure friction and/or leakage to a level that does not increase the fluid temperature to an unacceptable level.

Such an exemplary pump system 112 is intrinsically incapable of producing fluid temperatures that exceed a threshold value because all the components needed for the pressure and heat reduction to occur, are also required to successfully regulate the pump pressure during normal operation. Therefore, if the pump 114 is operating normally before a usage cycle, it is known that the prevention mechanism is operational. The exemplary pump system 112 also is less complex and more reliable than conventional systems that rely on temperature sensors and software control. In addition, the exemplary pump system 112 maintains operation of the pump system after the eutectic spacer 130 has melted by containing the hydraulic fluid to within the pump circuit. This is an improvement over conventional pump case fuse plug designs in which the hydraulic fluid is traditionally discharged out of the system and dumped overboard. Moreover, the exemplary pressure compensator 140 with thermally-responsive control component 130 may be easily retrofittable to conventional pump designs.

Figure 6:
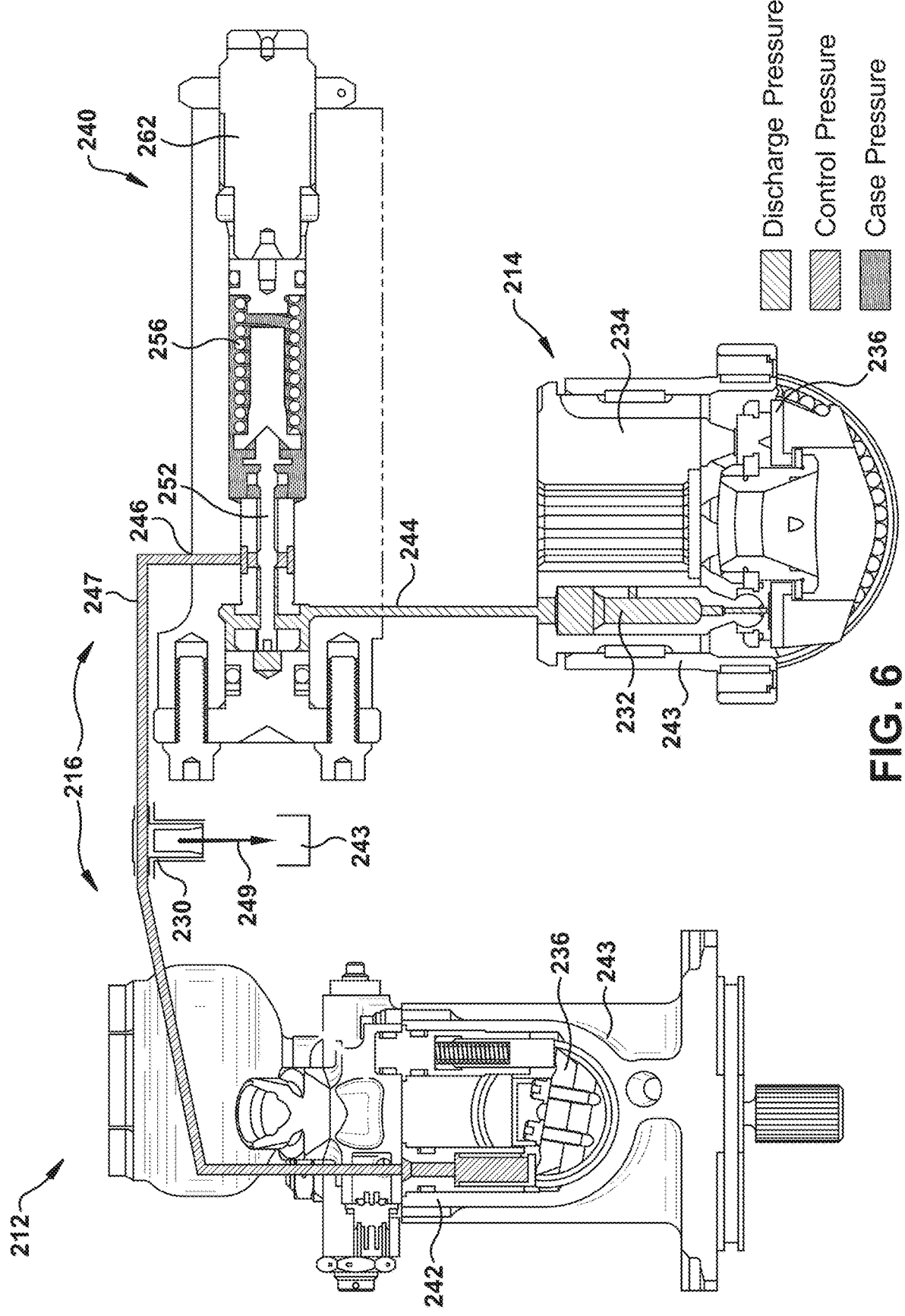
FIG. 6 shows a multi-cross-sectional and schematic view of another exemplary pump system according to another embodiment.

Turning to FIG. 6, another exemplary embodiment of a pump system 212 including a pump 214, a fluid-operated control 216, and a thermally-responsive control component 230 is shown. The pump system 212 is substantially similar to the above-referenced pump systems 12, 112, and consequently the same reference numerals but in the 200-series are used to denote structures corresponding to similar structures in the pump systems 12, 112, 212. In addition, the foregoing description of the pump system 12, 112 is equally applicable to the pump system 212, except as noted below. It is also understood that aspects of the pump systems 12, 112, 212 may be substituted for one another or used in conjunction with one another where applicable.

Similarly to the pump 114, the pump 214 in the illustrated embodiment is a pressure-compensated variable displacement axial piston pump in which the fluid-operated control 216 includes a pressure compensation valve assembly 240 and a control piston 242 operative with a swashplate 236. Unlike the pump 114, however, the pump 214 in the embodiment of FIG. 2 is configured such that the pump displacement defaults to minimum displacement. To achieve this, the pump 214 has re-routed the control line 247 pressure to the opposite side of the swashplate 236 to an on-stroke biased piston (also 242). This causes the unit to increase its displacement when the displacement control piston 242 is pressurized. Other than this, the normal operating state of the pump 214 is essentially similar to that of the pump 114.

In the illustrated embodiment, the thermally-responsive control component 230 made with the thermally-responsive material is formed as eutectic plug (also 230) that is placed into the control line 247, or control pressure routing. The eutectic material and activation temperature may be substantially the same as that described above for the eutectic spacer 130. As shown, the eutectic plug 230 may plug a passage 249 to pump case 243, for example. When an over-temperature event occurs that raises the temperature of the eutectic plug 230 to its activation temperature, the eutectic melts away, thereby venting the control pressure into the pump case 243. Without control pressure directly connected to pump case pressure, the pump 214 defaults to a decreased output pressure, and reduces its heat generating capability. In this manner, the eutectic plug 230 is configured to cooperate with the fluid-operated control 216 to cause a decrease in pump displacement. The venting of control pressure to the pump case 243 enables the pump system 212 to remain operational. In addition, the melting of the eutectic plug 230 can be detected during pressure performance tests prior to the next usage cycle.

Figure 7:
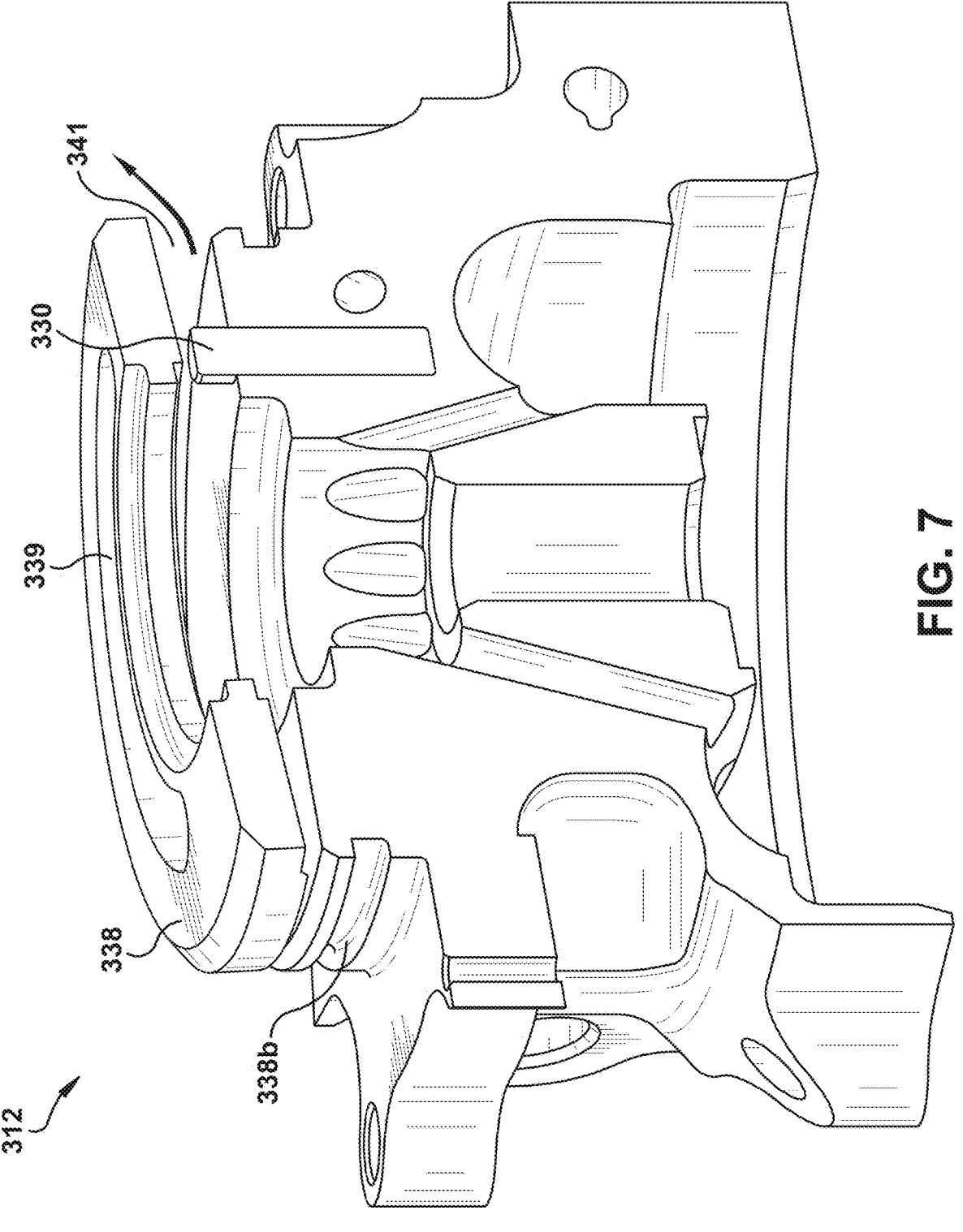
FIG. 7 shows a cross-sectional perspective view of a portion of a pump system according to another embodiment.

Turning to FIG. 7, another exemplary embodiment of a pump system 312 including a pump (not shown), a fluid-operated control (not shown), and a thermally-responsive control component 330 is shown. The pump system 312 is substantially similar to the above-referenced pump system 112, and consequently the same reference numerals but in the 300-series are used to denote structures corresponding to similar structures in the pump systems 112, 312. In addition, the foregoing description of the pump systems 12, 112, and 212 is equally applicable to the pump system 312, except as noted below. It is also understood that aspects of the pump systems 12, 112, 212 and 312 may be substituted for one another or used in conjunction with one another where applicable.

Similarly to the pump 114, the pump in the illustrated embodiment is a pressure-compensated variable displacement axial piston pump in which the fluid-operated control includes a pressure compensation valve (not shown) and a control piston (not shown) operative with a swashplate (not shown). As such, similarly to the pump 114, the pump 314 includes a port plate 338 and a port cap 338b. As is well-understood in the art, the cylinder block (not shown) interfaces against a mating surface of the stationary port plate 338. The inlet port (not shown) and outlet port 339 of the pump pass through different parts of the sliding interface between the cylinder block and port plate 338. The port plate 338 may have two semi-circular kidney ports that allow inlet of the operating fluid and exhaust of the outlet fluid respectively.

In the illustrated embodiment, the thermally-responsive control component 330 made with the thermally-responsive material is formed as a plug, pin or ring made with a thermal expansion material and which is located between the port plate 338 and the port cap 338b. The thermal expansion material of the component 330 is configured to expand by a prescribed amount in a particular direction (e.g., axially) at a prescribed activation temperature. In the illustrated embodiment, when the activation temperature of the thermal expansion material is reached, the amount of thermal expansion of the material is such that the port plate 338 is separated from the port cap 338b to form a leakage gap 341. The leakage gap 341 is large enough to greatly reduce pump discharge pressure and heat generation. The thermal expansion material of the component 330 may be a high coefficient of thermal expansion material, such as Polyether ether ketone (PEEK). In alternative embodiments, the thermally-responsive control component 330 may be made with a shape memory material (e.g., shape memory alloy or polymer) (e.g., Nitinol-nickel-titanium alloy) that activates at a preset temperature to expand or transform in a way that is sufficient to form the leakage gap 341. The leakage of fluid to the pump case enables the pump system 312 to remain operational.

Figure 8:
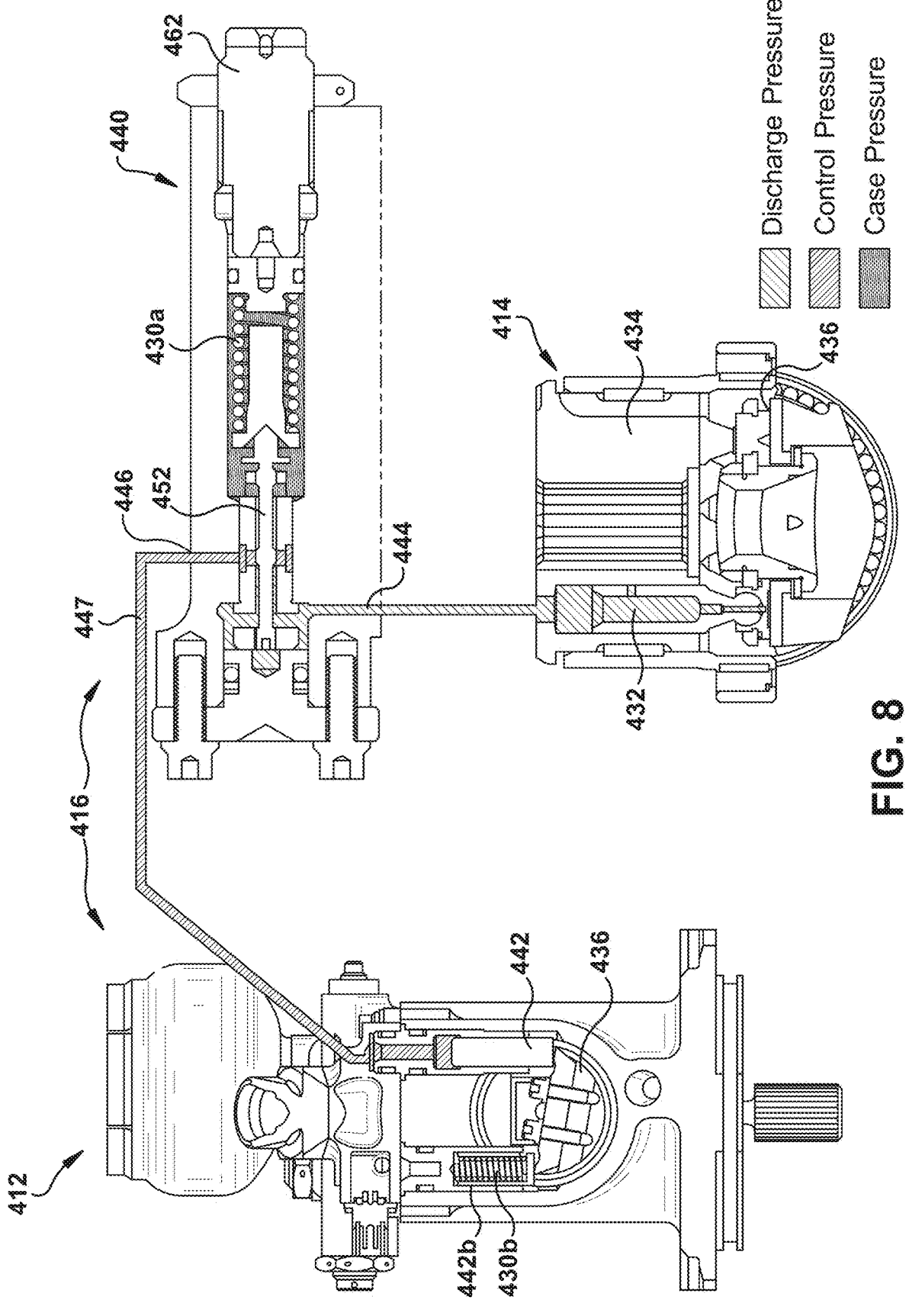
FIG. 8 shows a multi-cross-sectional and schematic view of an exemplary pump system according to another embodi-ment.

Turning to FIG. 8, another exemplary embodiment of a pump system 412 including a pump 414, a fluid-operated control 416, and one or more thermally-responsive control components 430a, 430b is shown. The pump system 412 is substantially similar to the above-referenced pump system 112, and consequently the same reference numerals but in the 400-series are used to denote structures corresponding to similar structures in the pump systems 112, 412. In addition, the foregoing description of the pump systems 12, 112, 212, and 312 is equally applicable to the pump system 412, except as noted below. It is also understood that aspects of the pump systems 12, 112, 212, 312 and 412 may be substituted for one another or used in conjunction with one another where applicable.

Similarly to the pump 114, the pump 414 in the illustrated embodiment is a pressure-compensated variable displacement axial piston pump in which the fluid-operated control 416 includes a pressure compensation valve assembly 440 and a control piston 442 operative with a swashplate 436. In the illustrated embodiment, the operation of the pump 414 in a normal operating state is the same as that of the pump 114 described above.

In the illustrated embodiment, the thermally-responsive control component 430a and/or 430b is made with the thermally-responsive material and may be formed as a spring, an actuator, or any other suitable force-generating component that is made with thermally-responsive material. In exemplary embodiments, the thermally-responsive material is a shape memory material which forms a shape memory component (also 430a, 430b). The shape memory material may be any suitable material capable of providing the desired force (e.g., spring or actuation force). For example, the shape memory material may be Nitinol. The shape-memory component 430a, 430b can be transformed to expand or contract when cold, but returns to its pre-transformed ("remembered") shape when heated to its preset activation temperature. In the illustrated embodiment, for example, the shape memory component 430a may cooperate with the pressure compensator 440 to alter the compensator setpoint pressure and/or the shape memory component 430b may cooperate with the control piston 442 to apply force to the swashplate 436 when the shape memory material reaches or exceeds its activation temperature. If the pressure is reduced, heat generating capability of the pump also will be reduced.

In exemplary embodiments, the shape memory component 430a is formed as a spring that is used as the compensator spring in the pressure compensation valve assembly 440. The shape memory compensator spring may be configured to contract in length when heated to its activation temperature to thereby reduce output pressure of the pump. Alternatively or additionally, the shape memory component 430a may be a separate component to the compensator spring that may act to push on the compensator spool 452 toward the spring when activated, thereby achieving the same result of reducing pump pressure.

Alternatively or additionally, the shape memory component 430b may be used to alter the angle of the swashplate 436. For example, the shape memory component 430b could be implemented as a spring in the on-stroke bias piston 442b and could be configured to contract in length when heated to its activation temperature. Alternatively or additionally, the shape memory component 430b could be implemented as an expanding device on the side, or inside, of the off-stroke bias piston 442. Either way, the pump output pressure is reduced.

An exemplary pump system including a prevention mechanism for preventing excessive fluid temperature buildup of system fluid has been described herein. The overheat prevention mechanism includes a thermally-responsive control component made with a thermally-responsive material. The thermally-responsive control component is located in the pump system such that the thermally-responsive material is in thermal communication with the system fluid for effecting a change in temperature of the thermally-responsive material. The thermally-responsive material is configured to have an activation temperature that is a predefined amount less than a maximum operating temperature of the system fluid. The thermally-responsive control component is configured to cooperate with a pump control mechanism in the system to decrease pump output pressure in response to the thermally-responsive material being heated by the fluid to a temperature that is equal to or greater than the activation temperature of the thermally-responsive material.

According to an aspect, a pump system includes: a pump for pumping fluid; a fluid-operated control fluidly connected to the pump and configured to increase or decrease pump displacement in response to a fluid pressure of the system being communicated to the fluid-operated control; and a thermally-responsive control component made with a thermally-responsive material, the thermally-responsive control component being located in the pump system such that the thermally-responsive material is in thermal communication with the fluid flowing through the pump system for effecting a change in temperature of the thermally-responsive material; wherein the thermally-responsive material is configured to have an activation temperature that is a predefined amount less than a maximum operating temperature of the fluid flowing through the pump system; and wherein the thermally-responsive control component is configured to cooperate with the fluid-operated control to cause a decrease in pump output pressure in response to the thermally-responsive material being heated by the fluid to a temperature that is equal to or greater than the activation temperature of the thermally-responsive material, and wherein the pump system can remain operational after the thermally-responsive material has reached or exceeded the activation temperature.

Embodiments may include one or more of the following additional features, separately or in any combination.

In some embodiments, the fluid-operated control includes a valve assembly that receives fluid downstream from the pump at a discharge pressure.

In some embodiments, in response to the discharge pressure, the valve assembly outputs fluid at a control pressure via a control fluid communication line that is operative to increase or decrease pump displacement.

In some embodiments, the thermally-responsive control component is located in the valve assembly and/or is located in the control fluid communication line.

In some embodiments, the fluid-operated control further includes a control actuator fluidly connected to the control fluid communication line downstream of the valve assembly for receiving fluid at the control pressure, the control actuator being operative to increase or decrease pump displacement in response to the control pressure.

In some embodiments, the thermally-responsive control component is located in the control actuator.

In some embodiments, the thermally-responsive control component is located between a source of pressurized-fluid and a pump case containing fluid at a case pressure that is lower than a pressure of the pressurized-fluid.

In some embodiments, when the thermally-responsive material is heated by the fluid to reach or exceed the activation temperature of the thermally-responsive material, the thermally-responsive control component is operative to open a leak path between the source of pressurized-fluid and the pump case to allow the fluid to leak into the pump case.

In some embodiments, the thermally-responsive material is in direct contact with fluid flowing through the pump system.

In some embodiments, the thermally-responsive material is a phase transition material.

In some embodiments, the phase transition material is a eutectic alloy.

In some embodiments, the phase transition material is a shape memory material.

In some embodiments, the thermally-responsive control component is a spacer, a plug, a switch, an actuator, a spring, an expander, or a support.

In some embodiments, the fluid-operated control includes a control actuator and a pressure compensation valve assembly, the pressure compensation valve assembly comprising: a valve body having an inlet in fluid communication with a discharge port of the pump for communicating a discharge pressure of the pump to the pressure compensation valve assembly, and an outlet in fluid communication with the control actuator for communicating a control pressure to the control actuator; a compensator spool movable in the valve body between the inlet and the outlet; and a compensator spring configured to apply a biasing force against one side of the compensator spool.

In some embodiments, the biasing force of the compensator spring counteracts the discharge pressure exerted against an opposite side of the compensator spool, and wherein the compensator spool moves between the inlet and the outlet in response to opposing forces exerted on the compensator spool by the biasing spring on the one side and the discharge pressure on the opposite side to control fluid exiting the outlet at the control pressure and being received by the control actuator, the control actuator being operative to increase or decrease pump displacement in response to the control pressure.

In some embodiments, the thermally-responsive control component is located in the pressure compensation valve assembly, and is configured such that when the activation temperature of the thermally-responsive material is reached or exceeded, the thermally-responsive control component transforms to alter the biasing force of the compensator spring on the compensator spool thereby changing the control pressure in a way that the control actuator decreases pump output pressure.

In some embodiments, the thermally-responsive control component is formed as a spacer located at a position axially offset from an end of the compensator spring.

In some embodiments, transformation of the spacer at the activation temperature causes the compensator spring to relax, thereby causing displacement of the compensator spool and changing the control pressure to thereby decrease pump output pressure.

In some embodiments, the thermally-responsive control material of the spacer is a eutectic alloy, and the activation temperature is a eutectic melting point of the eutectic alloy, the melting point having a value in a range from 10° C. to 100° C. less than the maximum operating temperature of the fluid.

In some embodiments, the fluid-operated control includes a pressure compensator that comprises a compensator spool disposed within a compensator sleeve, a compensator spring having at one end a compensator spring guide that is in functional engagement with the compensator sleeve and at an opposite end a compensator spring seat.

In some embodiments, the thermally-responsive control component is a spacer made with a eutectic material which is exposed to system fluid.

In some embodiments, when the temperature of the system fluid is elevated to reach activation temperature, the spacer melts thereby allowing the compensator spring to extend which causes a reduction in setpoint pressure of the pump due to displacement of the compensator spool which thereby reduces pump output pressure.

In some embodiments, the fluid-operated control includes a control actuator and a pressure compensation valve assembly, the pressure compensation valve assembly being fluidly connected to receive fluid downstream from the pump at a discharge pressure.

In some embodiments, in response to the discharge pressure, the pressure compensation valve assembly is configured to output fluid at a control pressure to the control actuator via a control fluid passage, the control actuator being operative to increase or decrease pump displacement in response to the control pressure.

In some embodiments, the thermally-responsive control component is formed as a plug that closes a vent passage fluidly connecting the control fluid passage to a pump case, the plug being made with a eutectic alloy having a eutectic melting point as the activation temperature.

In some embodiments, when the eutectic alloy melts at the melting point in response to heating by fluid passing through the control fluid passage, the fluid vents to the pump case via the vent passage.

In some embodiments, the pump is an axial piston pump having a port plate and a port cap.

In some embodiments, the thermally-responsive control component is disposed between the port plate and the port cap, the thermally-responsive material being a thermal expansion material that is configured to expand by a preset amount at the activation temperature to thereby form a leak path between the port plate and the port cap that leaks fluid to a pump case, thereby causing an internal leak that reduces pump discharge pressure.

In some embodiments, the fluid-operated control includes a control piston that is operative against a swashplate to vary pump displacement, and a pressure compensator having a compensator set point.

In some embodiments, the thermally-responsive control component is a spring or actuator made with a shape memory material.

In some embodiments, (i) the spring or actuator made with the shape memory material is located in the pressure compensator, such that, when reaching the activation temperature, alters a compensator setpoint pressure to decrease pump output pressure.

In some embodiments, (ii) the spring or actuator made with the shape memory material is located in the control piston or is operative against the swashplate, such that, when reaching the activation temperature, reduces pump output pressure.

In some embodiments, the pump is an axial-piston pump having a swashplate, and wherein the fluid-operated control includes a control actuator in the form of control piston that forces the swashplate between different swashplate angles to vary the pump displacement.

In some embodiments, the pump system forms a pump circuit including fluid conduits for receiving system fluid into the pump from a reservoir and for pumping pressurized system fluid to one or more fluid-operated consumers.

In some embodiments, the pump circuit includes an additional pump that is operable to receive the system fluid from the reservoir and pump the pressurized system fluid to the one or more fluid-operated actuators.

In some embodiments, when a faulty component of the pump increases temperature of the fluid in the pump circuit to a level that reaches or exceeds the activation temperature of the thermally-responsive material, the system fluid remains in the pump circuit such that the pump system can remain operational via operation of the additional pump.

In some embodiments, when the thermally-responsive material reaches or exceeds the activation temperature, transformation of the thermally-responsive control component causes the fluid-operated control to cause a decrease in pump output pressure, thereby decreasing pump output power and heat generating capacity of the pump.

In some embodiments, the activation of the thermally-responsive material relies on physical properties of the material (such as melting) which can be assumed to have no failure modes.

In some embodiments, the system prevents overheated fluid from exiting the pump.

In some embodiments, the system disables or reduces the power input at the source of the heat generation.

In some embodiments, the thermally-responsive component (e.g., eutectic spacer) is not subjected to fluid high pressure differentials.

In some embodiments, the system can be checked before, during and/or after each usage cycle.

According to another aspect, a hydraulic system for an aircraft includes: a fluid circuit having the pump system according to any of the foregoing aspects and/or features, separately or in any combination; a reservoir; a heat exchanger in a fuel cavity of the aircraft; and one or more fluid-operated devices that receive pressurized fluid from the pump to control one or more components of the aircraft.

According to another aspect, a pressure compensation valve assembly for a pump system includes: a valve body having an inlet for fluid communication with a discharge port of a pump of the system for communicating a discharge pressure of the pump to the pressure compensation valve assembly, and an outlet for fluid communication with a control actuator of the system for communicating a control pressure to the control actuator; a compensator spool movable in the valve body between the inlet and the outlet; a compensator spring configured to apply a biasing force against one side of the compensator spool which counteracts the discharge pressure exerted against an opposite side of the compensator spool, and wherein the compensator spool moves between the inlet and the outlet in response to opposing forces exerted on the compensator spool by the biasing spring on the one side and the discharge pressure on the opposite side to thereby control fluid exiting the outlet at the control pressure for being received by the control actuator which is operative to increase or decrease pump displacement in response to the control pressure; and a thermally-responsive control component made with a thermally-responsive material having an activation temperature that causes a transformation of the material, the thermally-responsive control component being located in the pressure compensation valve assembly such that when the activation temperature of the thermally-responsive material is reached or exceeded, the thermally-responsive control component transforms to alter the biasing force of the compensator spring on the compensator spool thereby changing the control pressure in a way that decreases pump output pressure.

According to another aspect, a hydraulic pump system includes a hydraulic pump and a pump pressure compensator that comprises a compensator spool and a compensator spring, and a eutectic spacer located in the pressure compensator such that the eutectic spacer is in thermal communication with system fluid, wherein when the temperature of the system fluid is elevated and increases the temperature of the eutectic spacer to its melting point, the eutectic spacer melts thereby allowing the compensator spring to extend and cause a decrease in pump output pressure.

According to another aspect, a eutectic plug disposed within a control pressure routing such that during an over-temperature condition, the eutectic melts away, thereby venting the control pressure into a pump case.

According to another aspect, a hydraulic pump system comprising a thermally expanding material disposed between a port plate and a port cap of a pump, wherein the thermally expanding material expands when heated, thereby causing an internal leak of the pump that reduces pump discharge pressure.

According to another aspect, a hydraulic pump system that includes a swashplate, a pressure compensator having a compensator set point, and a shape memory material that is operative to reduce pump output pressure.

According to another aspect, a method of decreasing pump output pressure when a fluid of the pump is overheated, includes: (i) pumping the fluid with the pump and discharging pressurized discharge fluid from the pump; (ii) routing at least some of the pressurized discharge fluid to a fluid-operated control; (iii) sensing a pressure of the pressurized discharge fluid with the fluid-operated control and outputting fluid at a charge pressure from the fluid-operated control; (iv) varying pump displacement in response to the charge pressure; (v) before, during, and/or after one or more of steps (i)-(iv), sensing fluid temperature with a thermally-responsive material having an activation temperature; (vi) when the temperature of the thermally-responsive material reaches the activation temperature, trigger the fluid-operated control to cause a decrease in pump output pressure; and (vii) wherein after activation of the thermally-responsive material, the fluid is maintained within a pump circuit containing the pump.

According to another aspect, a method of using the device according to any of the foregoing is provided.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

An "operable" or "operative" connection, or a connection by which entities are "operably" or "operatively" connected, is one in which the entities are connected in such a way that the entities may perform as intended. An operable or operative connection may be a direct connection or an indirect connection in which an intermediate entity or entities cooperate or otherwise are part of the connection or are in between the operably connected entities. An operable or operative connection or coupling may include the entities being integral and unitary with each other. An operable or operative connection may include one in which signals or physical communications may be sent or received.

It is to be understood that all ranges and ratio limits disclosed in the specification and claims may be combined in any manner. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure compensation valve assembly for a pump system, comprising:
a valve body having an inlet for fluid communication with a discharge port of a pump of the system for communicating a discharge pressure of the pump to the pressure compensation valve assembly, and an outlet for fluid communication with a control actuator of the system for communicating a control pressure to the control actuator;
a compensator spool movable in the valve body between the inlet and the outlet;
a compensator spring configured to apply a biasing force against one side of the compensator spool which counteracts the discharge pressure exerted against an opposite side of the compensator spool, and wherein the compensator spool moves between the inlet and the outlet in response to opposing forces exerted on the compensator spool by the biasing spring on the one side and the discharge pressure on the opposite side to thereby control fluid exiting the outlet at the control pressure for being received by the control actuator which is operative to increase or decrease pump displacement in response to the control pressure; and
a thermally-responsive control component made with a thermally-responsive material having an activation temperature that causes a transformation of the material, the thermally-responsive control component being located in the pressure compensation valve assembly such that when the activation temperature of the thermally-responsive material is reached or exceeded, the thermally-responsive control component transforms to alter the biasing force of the compensator spring on the compensator spool thereby changing the control pressure in a way that decreases pump output pressure.

2. A hydraulic pump system comprising a hydraulic pump and the pressure compensation valve according to claim 1, and
a eutectic spacer located in the pressure compensation valve such that the eutectic spacer is in thermal communication with system fluid, wherein when the temperature of the system fluid is elevated and increases the temperature of the eutectic spacer to its melting point, the eutectic spacer melts thereby allowing the compensator spring to extend and cause a decrease in pump output pressure.

3. The hydraulic pump system according to claim 2, further comprising a eutectic plug disposed within a control pressure routing such that during an over-temperature condition, the eutectic melts away, thereby venting the control pressure into a pump case of the hydraulic pump.

4. The hydraulic pump system according to claim 2, wherein the hydraulic pump comprises a port plate and a port cap, and
further comprising a thermally expanding material disposed between the port plate and the port cap of the hydraulic pump, wherein the thermally expanding material expands when heated, thereby causing an internal leak of the pump that reduces pump discharge pressure.

5. The hydraulic pump system according to claim 2, further comprising a swashplate, wherein the pressure compensation valve has a compensator set point, and a shape memory material that is operative to reduce pump output pressure.

6. A method of decreasing pump output pressure when a fluid of the pump is overheated, comprising:
(i) pumping the fluid with the pump and discharging pressurized discharge fluid from the pump;
(ii) routing at least some of the pressurized discharge fluid to a fluid-operated control;
(iii) sensing a pressure of the pressurized discharge fluid with the fluid-operated control and outputting fluid at a charge pressure from the fluid-operated control;
(iv) varying pump displacement in response to the charge pressure;
(v) before, during, and/or after one or more of steps (i)-(iv), sensing fluid temperature with a thermally-responsive material having an activation temperature;
(vi) when the temperature of the thermally-responsive material reaches the activation temperature, trigger the fluid-operated control to cause a decrease in pump output pressure; and (vii) wherein after activation of the thermally-responsive material, the fluid is maintained within a pump circuit containing the pump.

* * * * *